US012786157B2

(12) United States Patent
Su

(10) Patent No.: US 12,786,157 B2
(45) Date of Patent: Nov. 3, 2026

(54) DOMAIN NAME QUERY METHOD AND RELATED DEVICE

(71) Applicant: Huawei Cloud Computing Technologies Co., Ltd., Guizhou (CN)

(72) Inventor: Jiankang Su, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 48 days.

(21) Appl. No.: 17/827,264

(22) Filed: May 27, 2022

(65) Prior Publication Data

US 2022/0286495 A1 Sep. 8, 2022

Related U.S. Application Data

(63) Continuation of application No. PCT/CN2020/132284, filed on Nov. 27, 2020.

(30) Foreign Application Priority Data

Nov. 28, 2019 (CN) ......................... 201911188374.X

(51) Int. Cl.
*H04L 61/4511* (2022.01)
*H04L 67/02* (2022.01)
(Continued)

(52) U.S. Cl.
CPC .......... *H04L 61/4511* (2022.05); *H04L 67/02* (2013.01); *H04L 67/52* (2022.05); *H04L 67/62* (2022.05)

(58) Field of Classification Search
CPC ..... H04L 67/02; H04L 61/4511; H04L 67/52; H04L 67/62; H04L 67/568
See application file for complete search history.

(56) References Cited

U.S. PATENT DOCUMENTS 6,785,704 B1 * 8/2004 McCanne ............ H04L 67/101 709/239
7,565,411 B1 * 7/2009 Turcotte ................ H04W 4/029 455/457

(Continued)

FOREIGN PATENT DOCUMENTS

CN 102611763 A 7/2012
CN 102790808 A 11/2012

(Continued)

OTHER PUBLICATIONS

"Alibaba Cloud CDN—Service Management," Sep. 17, 2019. (Year: 2019).*

(Continued)

*Primary Examiner* — Andrew C Georgandellis
(74) *Attorney, Agent, or Firm* — Conley Rose, P.C.

(57) ABSTRACT

A domain name query method includes: an HTTPDNS server receives an HTTP request packet from a terminal device; the HTTPDNS server constructs a DNS query packet based on the HTTP request packet; the HTTPDNS server sends the DNS query packet to an authoritative DNS server; the HTTPDNS server receives a DNS reply packet from the authoritative domain name server; the HTTPDNS server constructs an HTTP reply packet based on the DNS reply packet; and the HTTPDNS server sends the HTTP reply packet to the terminal device. The HTTP reply packet carries the IP address of the to-be-accessed site.

18 Claims, 9 Drawing Sheets

(51) Int. Cl.
*H04L 67/52* (2022.01)
*H04L 67/62* (2022.01)

(56) References Cited

U.S. PATENT DOCUMENTS

| | | | | |
|---|---|---|---|---|
| 10,225,315 | B2 | 3/2019 | Gao | |
| 2002/0146102 | A1* | 10/2002 | Lang | H04M 15/805 379/114.12 |
| 2012/0023153 | A1* | 1/2012 | Karasaridis | H04L 67/52 709/203 |
| 2013/0173769 | A1* | 7/2013 | Seastrom | H04L 61/4511 709/223 |
| 2013/0297596 | A1 | 11/2013 | Mouline et al. | |
| 2017/0187768 | A1* | 6/2017 | Huang | H04L 67/1021 |
| 2020/0220942 | A1* | 7/2020 | Paranjpe | H04L 67/568 |
| 2021/0029075 | A1* | 1/2021 | Yu | H04L 67/02 |
| 2021/0058363 | A1* | 2/2021 | Shen | H04L 67/52 |
| 2021/0336920 | A1* | 10/2021 | Chen | H04L 43/0882 |
| 2022/0345514 | A1* | 10/2022 | Ma | H04L 67/02 |

FOREIGN PATENT DOCUMENTS

| | | | |
|---|---|---|---|
| CN | 104168340 | A | 11/2014 |
| CN | 104301454 | A | 1/2015 |
| CN | 105100294 | A | 11/2015 |
| CN | 106797410 | A | 5/2017 |
| CN | 107071091 | A | 8/2017 |
| CN | 108040085 | A | 5/2018 |
| CN | 108810180 | A | 11/2018 |
| CN | 109451081 | A | 3/2019 |
| CN | 109640319 | A | 4/2019 |
| WO | 2018112759 | A1 | 6/2018 |

OTHER PUBLICATIONS

Ericsson, "Solution to KI#1, DNS over HTTP," 3GPP TSG-SA/WG2 Meeting #136-AH, S2-2000197, Jan. 13-17, 2020, 4 pages.

A. Fidler et al., "DNS over HTTPS (DoH) Considerations for Operator Networks," draft-reid-doh-operator-00, Mar. 10, 2019, 18 pages.

S. Dickinson et al., "DoHPE: DoH with Privacy Enhancements," draft-dickinson-doh-dohpe-00, Jul. 18, 2018, 8 pages.

L.Song et al., "DNS wire-formatover HTTP," draft-song-dns-wireformat-http-04, Jun. 21, 2016, 10 pages.

C. Contavalli et al., "Client Subnet in DNS Queries," RFC 7871, May 2016, 30 pages.

P. Hoffman et al., "DNS QUeries over HTTFS (DOH)," RFC 8484, Oct. 2018, 22 pages.

S. Kerr et al., "A roview of DNS over port 80/443," draft-shane-review-dns-over-http-04, Nov. 14, 2016, 8 pages.

* cited by examiner

DOMAIN NAME QUERY METHOD AND RELATED DEVICE

CROSS-REFERENCE TO RELATED APPLICATIONS

This is a continuation of International Patent Application No. PCT/CN2020/132284 filed on Nov. 27, 2020, which claims priority to Chinese Patent Application No. 201911188374.X filed on Nov. 28, 2019, the disclosures of which are hereby incorporated by reference in their entirety.

TECHNICAL FIELD

This application relates to the IT field, and in particular, to a domain name query method and a related device.

BACKGROUND

In recent years, as the Internet rapidly develops, a user imposes an increasingly high requirement on a delay of accessing an origin-server site by a terminal device. To improve access experience of the user, an operator establishes a content delivery network (CDN) for acceleration.

However, in the conventional technology, scheduling of the content delivery network has a scheduling deviation problem, resulting in a longer access delay.

SUMMARY

To resolve the foregoing problem, this application provides a domain name query method and a related device, to avoid a scheduling deviation and schedule a terminal device to a truly optimal edge cache node.

According to a first aspect, a domain name query method is provided, including:

A Hypertext Transfer Protocol Domain Name System (HTTPDNS) server receives a Hypertext Transfer Protocol (HTTP) request packet sent by a terminal device, where the HTTP request packet carries a to-be-accessed domain name and scheduling information of the terminal device; the HTTPDNS server constructs a Domain Name System (DNS) query packet based on the HTTP request packet, and sends the DNS query packet to an authoritative domain name server, where the DNS query packet carries the to-be-accessed domain name and the scheduling information; the HTTPDNS server receives a DNS reply packet sent by the authoritative domain name server, where the DNS reply packet carries an Internet Protocol (IP) address of a to-be-accessed site, and the to-be-accessed site is an edge cache node that is selected by the authoritative domain name server from a plurality of sites of the to-be-accessed domain name and that corresponds to the scheduling information; and the HTTPDNS server constructs an HTTP reply packet based on the DNS reply packet, and sends the HTTP reply packet to the terminal device, where the HTTP reply packet carries the IP address of the to-be-accessed site.

In some possible designs, that the HTTPDNS server constructs a DNS query packet based on the HTTP request packet includes: the HTTPDNS server sets the scheduling information in a resource data field of the DNS query packet.

In some possible designs, the scheduling information of the HTTP request packet and the DNS query packet includes a geographical location of the terminal device, and the to-be-accessed site is an edge cache node that is selected by the authoritative domain name server from a plurality of edge cache nodes of the to-be-accessed domain name and that corresponds to the geographical location of the terminal device.

In some possible designs, the scheduling information of the HTTP request packet and the DNS query packet further includes information about an operator to which the terminal device belongs, and the to-be-accessed site is an edge cache node that is selected by the authoritative domain name server from the plurality of edge cache nodes of the to-be-accessed domain name and that is nearest to the geographical location among sites provided by the operator.

According to a second aspect, a domain name query method is provided, including: an authoritative domain name server receives a DNS query packet sent by an HTTPDNS server, where the DNS query packet carries a to-be-accessed domain name and scheduling information; the authoritative domain name server selects, based on the scheduling information, an edge cache node corresponding to the scheduling information from a plurality of edge cache nodes of the to-be-accessed domain name as a to-be-accessed site; and the authoritative domain name server sends a DNS reply packet to the HTTPDNS server, where the DNS replay packet carries an IP address of the to-be-accessed site.

In some possible designs, the scheduling information is set in a resource data field of the DNS query packet.

In some possible designs, the scheduling information includes a geographical location of a terminal device, and the authoritative domain name server selects an edge cache node nearest to the geographical location from the plurality of edge cache nodes of the to-be-accessed domain name as the to-be-accessed site based on the geographical location.

In some possible designs, the scheduling information further includes information about an operator to which the terminal device belongs, and the authoritative domain name server selects an edge cache node, nearest to the geographical location among edge cache nodes provided by the operator, from the plurality of edge cache nodes of the to-be-accessed domain name as the to-be-accessed site based on the geographical location and the information about the operator.

According to a third aspect, an HTTPDNS server is provided, including a receiving module, a constructing module, and a sending module.

The receiving module is configured to receive an HTTP request packet sent by a terminal device, and the HTTP request packet carries a to-be-accessed domain name and scheduling information of the terminal device.

The constructing module is configured to construct a DNS query packet based on the HTTP request packet.

The sending module is configured to send the DNS query packet to an authoritative domain name server, and the DNS query packet carries the to-be-accessed domain name and the scheduling information.

The receiving module is configured to receive a DNS reply packet sent by the authoritative domain name server. The DNS reply packet carries an IP address of a to-be-accessed site, and the to-be-accessed site is an edge cache node that is selected by the authoritative domain name server from a plurality of edge cache nodes of the to-be-accessed domain name and that corresponds to the scheduling information.

The constructing module is configured to construct an HTTP reply packet based on the DNS reply packet.

The sending module is configured to send the HTTP reply packet to the terminal device, and the HTTP reply packet carries the IP address of the to-be-accessed site.

In some possible designs, the constructing module is configured to set the scheduling information in a resource data field of the DNS query packet.

In some possible designs, the scheduling information of the HTTP request packet and the DNS query packet includes a geographical location of the terminal device, and the to-be-accessed site is an edge cache node that is selected by the authoritative domain name server from the plurality of edge cache nodes of the to-be-accessed domain name and that corresponds to the geographical location of the terminal device.

In some possible designs, the scheduling information of the HTTP request packet and the DNS query packet further includes information about an operator to which the terminal device belongs, and the to-be-accessed site is an edge cache node that is selected by the authoritative domain name server from the plurality of edge cache nodes of the to-be-accessed domain name and that is nearest to the geographical location among sites provided by the operator.

According to a fourth aspect, an authoritative domain name server is provided, including a receiving module, a selection module, and a sending module.

The receiving module is configured to receive a DNS query packet sent by an HTTPDNS server, and the DNS query packet carries a to-be-accessed domain name and scheduling information.

The selection module is configured to select, based on the scheduling information, an edge cache node corresponding to the scheduling information from a plurality of edge cache nodes of the to-be-accessed domain name as a to-be-accessed site.

The sending module is configured to send a DNS reply packet to the HTTPDNS server, and the DNS reply packet carries an IP address of the to-be-accessed site.

In some possible designs, the scheduling information is set in a resource data field of the DNS query packet.

In some possible designs, the scheduling information includes a geographical location of a terminal device.

The selection module is configured to select an edge cache node nearest to the geographical location from the plurality of edge cache nodes of the to-be-accessed domain name as the to-be-accessed site based on the geographical location.

In some possible designs, the scheduling information further includes information about an operator to which the terminal device belongs.

The selection module is configured to select an edge cache node, nearest to the geographical location among edge cache nodes provided by the operator, from the plurality of edge cache nodes of the to-be-accessed domain name as the to-be-accessed site based on the geographical location and the information about the operator.

According to a fifth aspect, a server is provided, including a memory and a processor. The processor executes a program in the memory to run a computing service and a storage service, to perform the method according to either the first aspect or the second aspect.

According to a sixth aspect, a readable storage medium is provided, including instructions. When the instructions are run on a server, the server is enabled to perform the method according to either the first aspect or the second aspect.

According to a seventh aspect, a computer program product is provided. When the computer program product is read and executed by a computer, the method according to either the first aspect or the second aspect is to be performed.

In the foregoing solution, the terminal device adds the geographical location to the HTTP request packet, and sends the HTTP request packet to the HTTPDNS server. Then, the HTTPDNS server adds the geographical location to the DNS query packet, and sends the DNS query packet to the authoritative domain name server. The authoritative domain name server selects the edge cache node nearest to the geographical location from the plurality of edge cache nodes of the to-be-accessed domain name as the to-be-accessed site based on the geographical location, and enables the terminal device to access the to-be-accessed site. The geographical location is a real geographical location of the terminal device. Therefore, when the authoritative domain name server performs scheduling based on the geographical location, no scheduling deviation occurs, and the terminal device can be scheduled to a truly optimal edge cache node.

BRIEF DESCRIPTION OF DRAWINGS

To describe the technical solutions in embodiments of this application or in the background more clearly, the following describes the accompanying drawings used to describe the embodiments of this application or the background.

DESCRIPTION OF EMBODIMENTS

Figure 1:
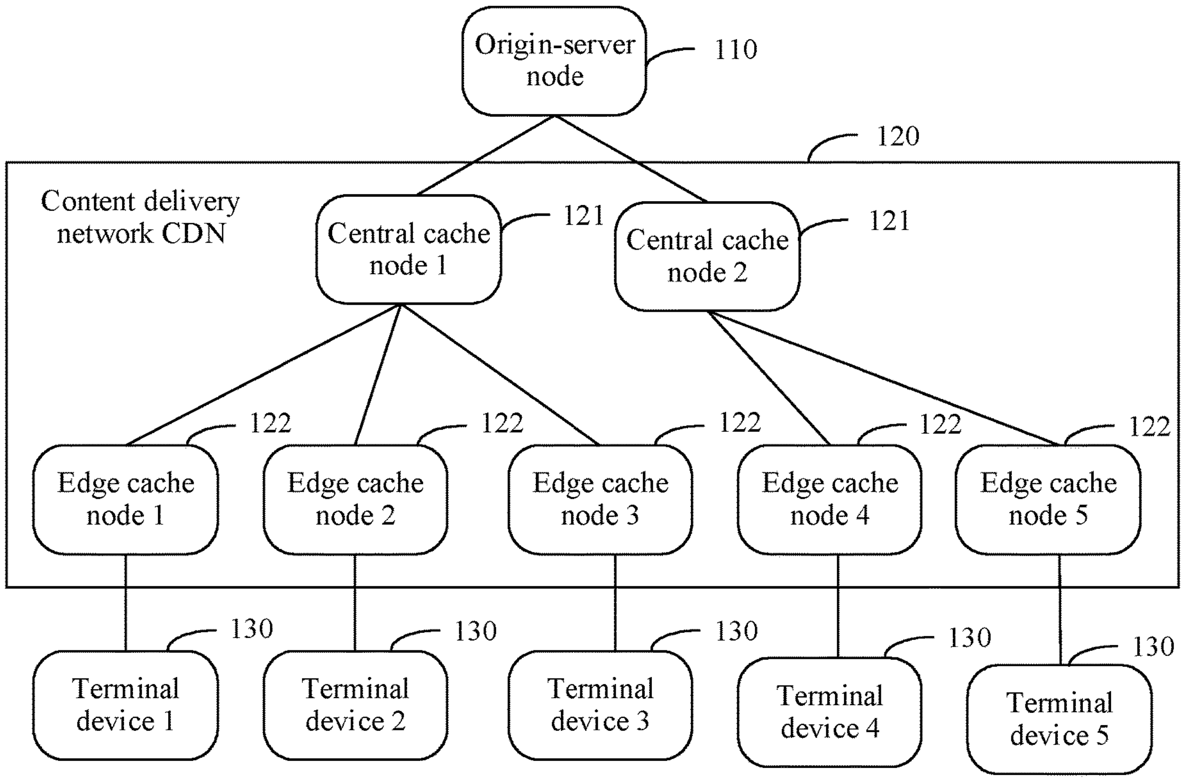
FIG. 1 is a schematic diagram of a structure of a delivery system according to this application.

FIG. 1 is a schematic diagram of a structure of a delivery system according to this application. As shown in FIG. 1, the delivery system includes an origin-server node 110, a CDN 120, and terminal devices 130. The CDN includes central cache nodes 121 and edge cache nodes 122.

The terminal device 130 is usually a device having a network communication function, and is configured to be used by a user to access content data of the origin-server node 110. The terminal device may be a computer, a network computer, a tablet computer, a network computer, a desktop computer, a thin terminal, a cloud terminal, a dumb terminal, or the like. Alternatively, the terminal device may be a smartphone, a smart home device, a vehicle-mounted device, a wearable device, or the like that uses the IPv4 or IPv6 protocol in the Internet protocol. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands or smart jewelry for monitoring physical signs.

The origin-server node 110 is usually disposed in a data center far from the terminal device 130, and is configured to store a large amount of content data. For example, the origin-server node 110 may be a node of a website that provides watching or downloading of an entertainment video, a sports video, a news video, a movie, or another video, may be a node of a website that provides audio playing of music, a book, or the like, or may be a node of a website that provides text reading of news, an article, a book, or the like. This is not limited herein.

The central cache node 121 is an upper-level node of the edge cache node 122, and the central cache node 121 is also a lower-level node of the origin-server node 110. In other words, the central cache node 121 may serve as a link between the origin-server node 110 and the edge cache node 122.

The edge cache node 122 may also be referred to as a surrogate, is only "single hop" away from the terminal device 130, and is configured to cache content data delivered by the origin-server node 110 to the edge cache node 122, so as to implement nearby access of the terminal device 130. The edge cache node 122 stores an image of the origin-server node 110, and the edge cache node 122 is usually disposed on a network edge. In this way, the edge cache node 122 may provide content data to the terminal device 130 instead of the origin-server node 110, to implement edge storage and propagation of the content data, resolve a network congestion situation, and improve a response speed of accessing the origin-server node 110 by the terminal device 130.

The following separately describes in detail principles of disposing the origin-server node 110, the central cache node 121, the edge cache node 122, and the terminal device 130.

The origin-server node 110 may be independently disposed in a single server, or may be disposed in a data center. When the origin-server node 110 is disposed in a single server, the server may be disposed in any area in the world. When the origin-server node 110 is disposed in a data center, the origin-server node 110 may be disposed in an area with sufficient power supply, a low land price, and a relatively good cooling condition. Certainly, when factors such as costs are not considered, the origin-server node 110 may also be disposed in any area in the world.

The central cache node 121 may be independently disposed in a single server, or may be disposed in a data center. When the central cache node 121 is disposed in a single server, the server may be disposed in any area in the world. When the central cache node 121 is disposed in a data center, the central cache node 121 may be disposed in an area with sufficient power supply, a low land price, and a relatively good cooling condition. Certainly, when factors such as costs are not considered, the central cache node 121 may also be disposed in any area in the world.

The edge cache nodes 122 may be separately disposed in a plurality of different areas. For example, an edge cache node 1 may be disposed in South China, an edge cache node 2 is disposed in Central China, an edge cache node 3 is disposed in West China, an edge cache node 4 is disposed in North China, an edge cache node 5 is disposed in East China, and the like. This is not limited herein.

The terminal devices 130 may be separately disposed in a plurality of different regions. For example, a terminal device 1 may be disposed in South China, a terminal device 2 is disposed in Central China, a terminal device 3 is disposed in West China, a terminal device 4 is disposed in North China, a terminal device 5 is disposed in East China, and the like. This is not limited herein.

In other words, the edge cache node 1 is located in South China, and the terminal device 1 is located in South China. Therefore, the terminal device 1 and the edge cache node 1 are located in a same area, and are nearest. The edge cache node 2 is located in Central China, and the terminal device 2 is located in South China. Therefore, the terminal device 2 and the edge cache node 2 are located in a same area, and are nearest. The edge cache node 3 is located in West China, and the terminal device 3 is located in South China. Therefore, the terminal device 3 and the edge cache node 3 are located in a same area, and are nearest. The edge cache node 4 is located in North China, and the terminal device 4 is located in South China. Therefore, the terminal device 4 and the edge cache node 4 are located in a same area, and are nearest. The edge cache node 5 is located in East China, and the terminal device 5 is located in South China. Therefore, the terminal device 5 and the edge cache node 5 are located in a same area, and are nearest.

To ensure that the terminal device 130 can obtain the content data of the origin-server node 110 as soon as possible, the content data of the origin-server node 110 may be separately sent to each edge cache node 122 in advance through the central cache node 121. Then, when the terminal device 130 requests the content data from the origin-server node 110, the terminal device 130 is scheduled to an edge cache node 122 "nearest" to the terminal device 130. Then, the edge cache node 122 "nearest" to the terminal device 130 sends the content data to the terminal device 130 instead of the origin-server node 110. For example, the origin-server node 110 may separately send the content data to edge ecaches 1 to 5 in advance through the central cache node 121. When the terminal device 1 requests the content data from the origin-server node 110, the terminal device 1 and the edge cache node 1 are nearest. Therefore, the terminal device 1 may be scheduled to the edge cache node 1 "nearest" to the terminal device 1, and the edge cache node 1 sends the content data to the terminal device 1 instead of the origin-server node 110. When the terminal device 2 requests the content data from the origin-server node 110, the terminal device 2 and the edge cache node 2 are nearest. Therefore, the terminal device 2 may be scheduled to the edge cache node 2 "nearest" to the terminal device 2, and the edge cache node 2 sends the content data to the terminal device 2 instead of the origin-server node 110. When the terminal device 3 requests the content data from the origin-server node 110, the terminal device 3 and the edge cache node 3 are nearest. Therefore, the terminal device 3 may be scheduled to the edge cache node 3 "nearest" to the terminal device 3, and the edge cache node 3 sends the content data to the terminal device 3 instead of the origin-server node 110. When the terminal device 4 requests the content data from the origin-server node 110, the terminal device 4 and the edge cache node 4 are nearest. Therefore, the terminal device 4 may be scheduled to the edge cache node 4 “nearest” to the terminal device 4, and the edge cache node 4 sends the content data to the terminal device 4 instead of the origin-server node 110. When the terminal device 5 requests the content data from the origin-server node 110, the terminal device 5 and the edge cache node 5 are nearest. Therefore, the terminal device 5 may be scheduled to the edge cache node 5 “nearest” to the terminal device 5, and the edge cache node 5 sends the content data to the terminal device 5 instead of the origin-server node 110.

It can be learned that the CDN is used in the delivery system to accelerate the origin-server node. In another embodiment, a quantity of origin-server nodes is not limited to 1, and may be another positive integer, a quantity of central cache nodes is not limited only to 2, and may be another positive integer, and a quantity of the edge cache nodes is also not limited to 5, and may be another positive integer. This is not limited herein.

Figure 2:
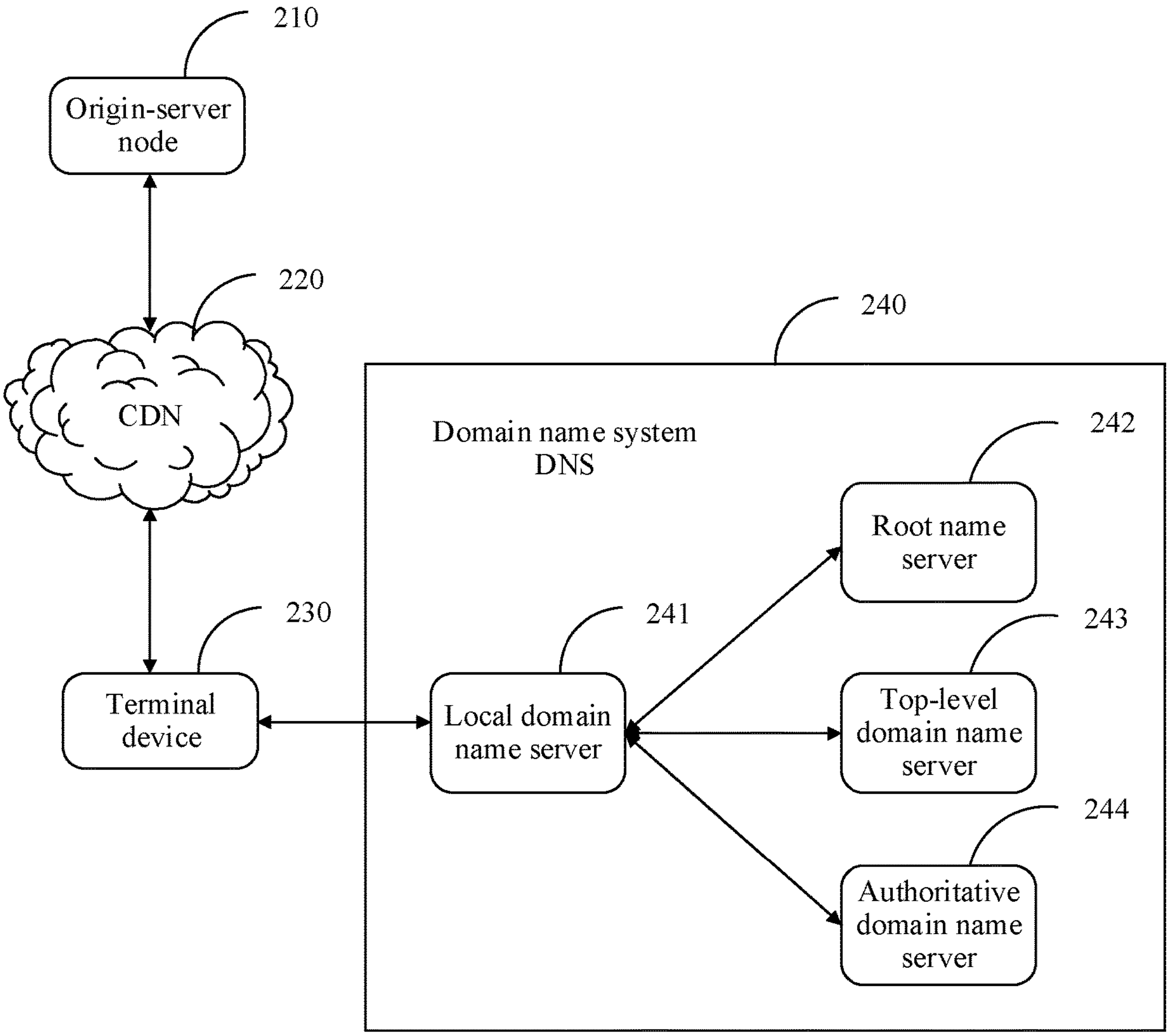
FIG. 2 is a schematic diagram of a structure of a transmission network according to this application.

FIG. 2 is a schematic diagram of a structure of a transmission network according to this application. As shown in FIG. 2, the transmission network includes an origin-server node 210, a CDN 220, a terminal device 230, and a DNS 240. The origin-server site 210 is connected to the CDN 220, the CDN 220 is connected to the terminal device 230, and the terminal device 230 is connected to the DNS 240.

The origin-server site 210, the CDN 220, and the terminal device 230 are respectively similar to the origin-server node 110, the CDN 120, and the terminal device 130 shown in FIG. 1. For details, refer to the foregoing descriptions. Details are not described herein again.

The DNS 240 is configured to perform domain name resolution, that is, resolve a domain name into a network address. The domain name is a name, including a string of characters separated by a dot, of a terminal device on the Internet, and is used to identify an electronic orientation of the terminal device during data transmission. The domain name may include a top-level domain name, a second-level domain name, a host name, or the like. For example, the domain name may be “www.xxxx.com”. In this case, the top-level domain name may be “.com”, the second-level domain name may be “.xxxxx”, and the host name is “www”, or the like. The network address is a logical address allocated to an origin-server node on the Internet, to shield a difference in physical addresses. The network address may include an IPv4 address and an IPv6 address. For example, the IPv4 address may be “192.168.xxx.xxx”, and the IPv6 address may be “2001:DB8:0:23:8:xxxx:xxxx:xxxx”. It may be understood that a user is used to memorizing the domain name, but the terminal device can identify only the network address. Therefore, a one-to-one correspondence needs to be made between the domain name and the network address, so that a domain name input by the user can be converted into a network address that can be identified by the terminal device, to reduce a burden of memorizing an address of the origin-server node by the user.

The DNS 240 includes a local domain name server 241, a root name server 242, a top-level domain name server 243, and an authoritative domain name server 244. The local domain name server 241 is separately connected to the root name server 242, the top-level domain name server 243, and the authoritative domain name server 244. The local domain name server 241 may be referred to as a recursive DNS server and a default domain name server, and is configured to cache a correspondence between some domain names and some network addresses (which are accessed before). In addition, a network address of each root name server 242 is set inside the local domain name server 241. The root name server 242 stores a correspondence between all the top-level domain names and the domain name servers. In an IPv4 system, there are totally only 13 root name servers 242 in the world, which are one primary root name server and 12 secondary root name servers. In an IPv6 system, 25 root name servers 242 are already disposed in the world, which are three primary root name servers and 22 secondary root name servers. Usually, the root name server 242 is disposed away from the terminal device 230. The top-level domain name server 243 stores a network address of the authoritative domain name server 244 subordinate to the top-level domain name server 243. The authoritative domain name server 244 stores a mapping relationship between the domain name and the network address.

The terminal device 230 receives a domain name, entered and expected to be accessed by the user, of the origin-server node 210, and then invokes a domain name resolution library to map the domain name, to obtain a canonical name (CNAME) record of the domain name in the CDN. The terminal device 230 first checks whether the terminal device 230 locally caches a mapping relationship between the canonical name record and a network address corresponding to the canonical name record. If the terminal device 230 does not cache the mapping relationship between the canonical name record and the network address corresponding to the canonical name record, the terminal device 230 sends a first query request to the local domain name server 241. The first query request is used to query the network address corresponding to the canonical name record, and the first query request carries the canonical name record and a network address of the terminal device 230. The local domain name server 241 locally queries whether the mapping relationship between the local domain name and the network address corresponding to the canonical name record is cached, and if the mapping relationship between the canonical name record and the network address corresponding to the canonical name record is not cached, the local domain name server 241 sends a second query request to the root name server 242. The second query request is used to query the network address corresponding to the canonical name record, and the second query request carries the canonical name record and a network address of the local domain name server. The root name server 242 determines a network address of a corresponding top-level domain name server 243 based on a top-level domain name in the canonical name record in the second query request, and sends the network address of the top-level domain name server 243 to the local domain name server 241. The local domain name server 241 sends the second query request to the top-level domain name server 243 based on the network address of the top-level domain name server 243. If the top-level domain name server finds that the second query request cannot be processed, the top-level domain name server sends the network address of the authoritative domain name server 244 subordinate to the top-level domain name server to the local domain name server 241. The local domain name server 241 sends the second query request to the authoritative domain name server 244 based on the network address of the authoritative domain name server 244. The authoritative domain name server 244 locally queries whether a mapping relationship between the canonical name record and network addresses of a plurality of edge cache nodes corresponding to the canonical name record is stored; if the mapping relationship between the canonical name record and the network addresses of the plurality of edge cache nodes corresponding to the canonical name record is stored, selects, from the network addresses of the plurality of edge cache nodes based on the network address of the local domain name server 241 carried in the second query request, a network address of an edge cache node that is nearest to the network address of the local domain name server 241; and sends the network address of the edge cache node to the local domain name server 241. The local domain name server 241 sends the network address that corresponds to the canonical name record and that is of the nearest edge cache node to the terminal device 230. The terminal device 230 establishes a connection between the terminal device 310 and the edge cache node based on the network address of the edge cache node, so that the edge cache node can provide content data to the terminal device 230 instead of the origin-server node 210.

All network addresses of edge cache nodes queried by the authoritative domain name server need to be sent to the local domain name server. Therefore, the network address in the query request sent by the local domain name server to the authoritative domain name server needs to be the network address of the local domain name server instead of the terminal device 230. When the authoritative domain name server 244 performs scheduling, that is, selects a network address of an optimal edge cache node from the network addresses of the plurality of edge cache nodes, only the network address of the local domain name server 241 can be used. Therefore, a scheduling deviation may occur, and the terminal device 230 cannot be scheduled to a truly optimal edge cache node.

In the foregoing example, an application scenario of the CDN is used as an example for description. However, in actual application, the transmission network may further be applicable to a cross-region application scenario or an application scenario deployed by an operator. This is not limited herein.

This application provides a domain name query method and a related device, to avoid a scheduling deviation and schedule a terminal device to a truly optimal edge cache node.

Figure 3:
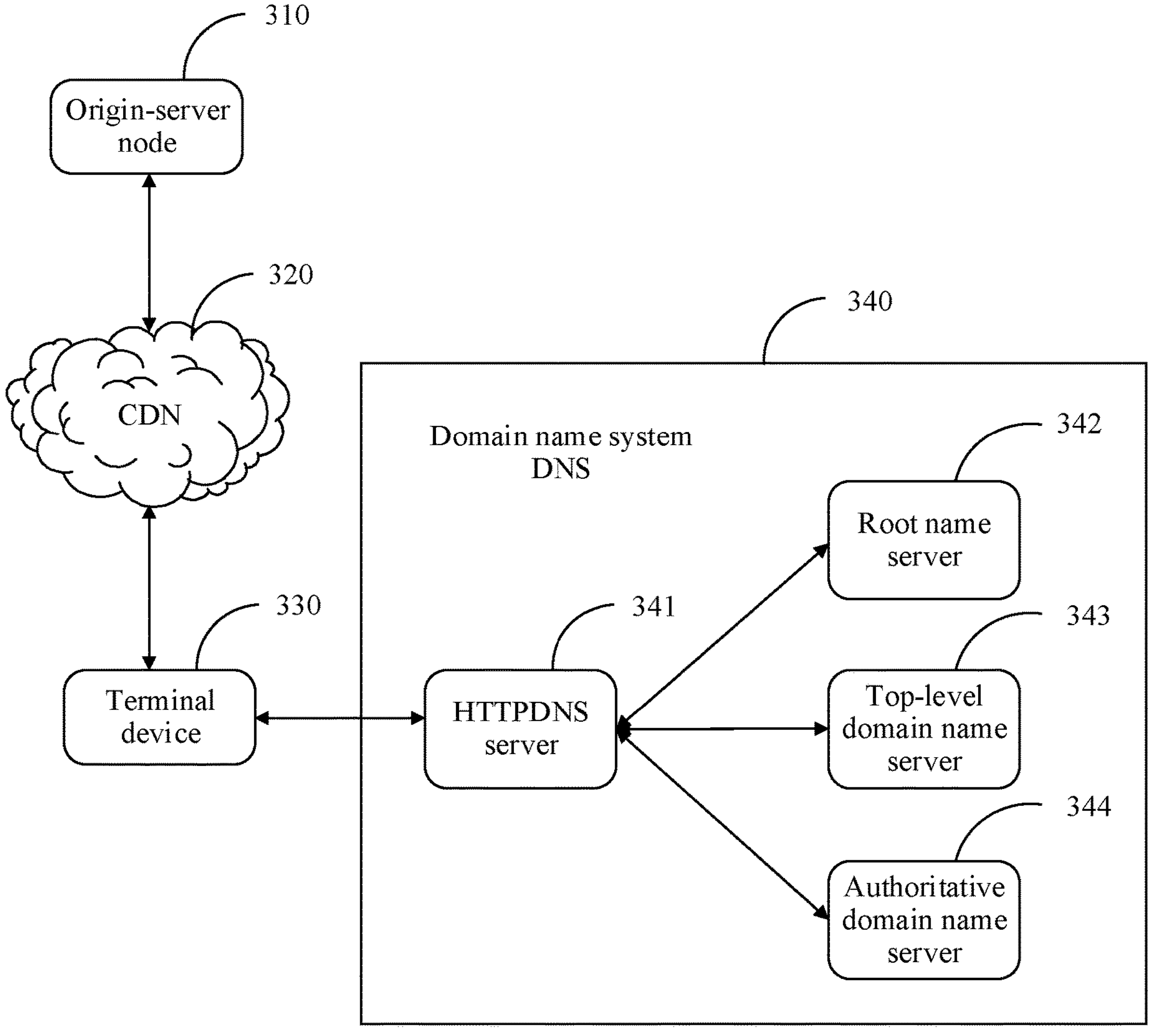
FIG. 3 is a schematic diagram of a structure of a domain name query system according to this application.

FIG. 3 is a schematic diagram of a structure of a domain name query system according to this application. The domain name query system in this implementation includes an origin-server node 310, a CDN 320, a terminal device 330, an HTTPDNS server 340, and an authoritative server 350. The origin-server site 310 is connected to the CDN 320, the CDN 320 is connected to the terminal device 330, and the terminal device 330 is connected to the DNS 340. The DNS 340 includes an HTTPDNS server 341, a root name server 342, a top-level domain name server 343, and an authoritative domain name server 344.

Figure 4:
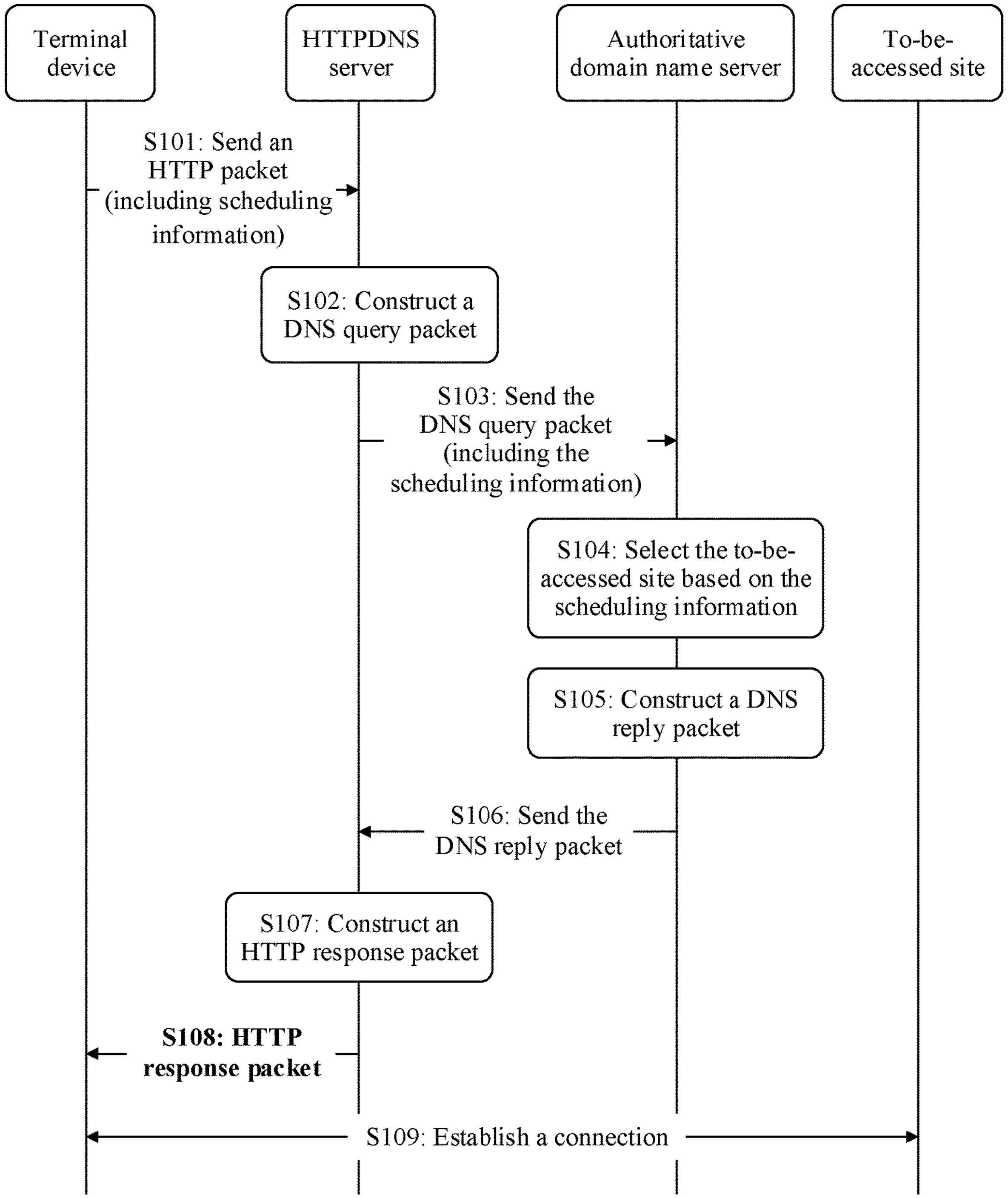
FIG. 4 is an interaction flowchart of a domain name query method according to this application.

FIG. 4 is an interaction flowchart of a domain name query method according to this application. The following describes the domain name query method in this implementation in detail with reference to the domain name query system shown in FIG. 3. The domain name query method in this implementation includes the following steps.

S101: A terminal device sends an HTTP request packet to an HTTPDNS server. Correspondingly, the HTTPDNS server receives the HTTP request packet sent by the terminal device.

In an implementation of this application, the HTTP request packet carries a to-be-accessed domain name and scheduling information of the terminal device. The scheduling information may be a geographical location, a combination of a geographical location and information about an operator, or the like. This is not limited herein. The geographical location may be longitude and latitude, an administrative area, a street, or the like. This is not limited herein.

Figure 5:
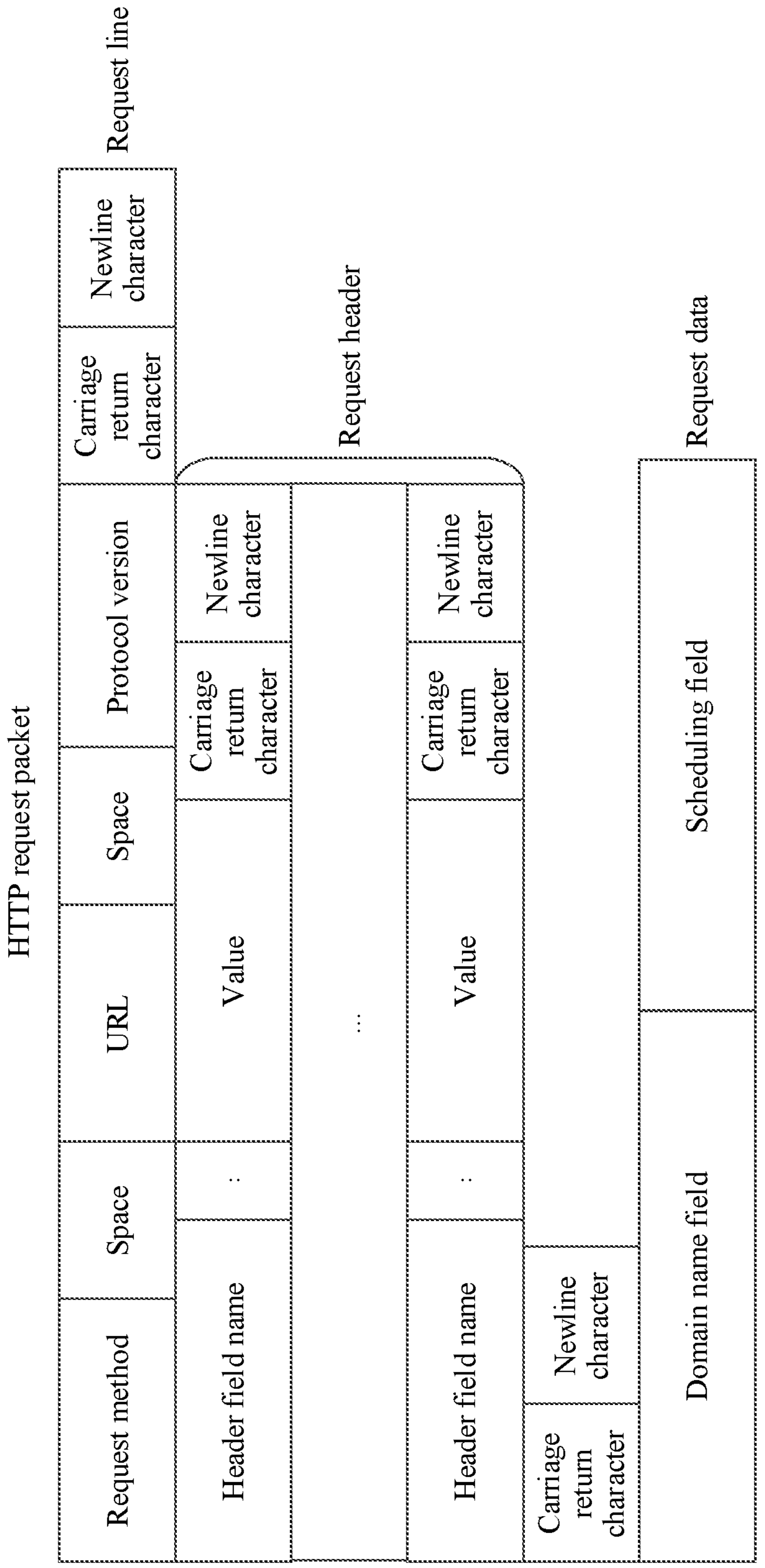
FIG. 5 is a schematic diagram of a structure of an HTTP request packet according to this application.

In an implementation of this application, as shown in FIG. 5, the HTTP request packet may include a request line, a request header, an empty line, and request data. The request line includes a request method field, a URL field, and an HTTP protocol version field. The request header includes a keyword/value pair. Each line includes one pair. A keyword and a value are separated by using an English colon ":", and is used to notify the server of information about a client request. The blank line follows the last request header, may be a carriage return character or a newline character, and is used to notify the server that there is no request header anymore in the following. The request data may be used to carry the to-be-accessed domain name and the scheduling information of the terminal device. In an embodiment, the request data may include a domain name field and a scheduling (geo) field. The domain name field is used to carry the to-be-accessed domain name, and the scheduling field is used to carry the scheduling information of the terminal device.

In an implementation of this application, the terminal device 330 receives a to-be-accessed domain name, entered and expected to be accessed by a user, of the origin-server node 310, and then invokes a domain name resolution library to map the to-be-accessed domain name, to obtain a CNAME record of the to-be-accessed domain name in the CDN. The terminal device 330 first checks whether the terminal device 330 locally caches a mapping relationship between the canonical name record and a network address corresponding to the canonical name record. If the terminal device 330 does not store the mapping relationship between the canonical name record and the network address corresponding to the canonical name record, the terminal device 330 sends the HTTP request packet to the HTTPDNS server 341.

S102: The HTTPDNS server constructs a DNS query packet based on the HTTP request packet.

In an implementation of this application, the DNS query packet carries the to-be-accessed domain name and the scheduling information of the terminal device.

Figure 6:
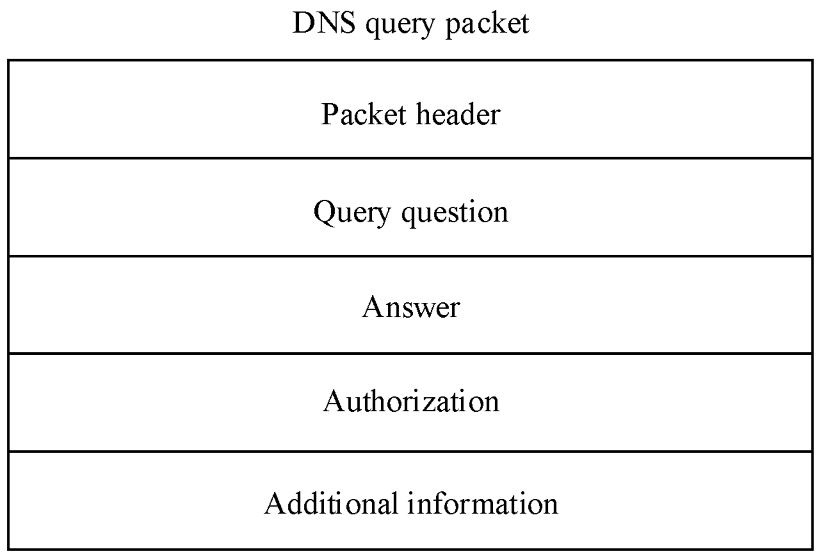
FIG. 6 is a schematic diagram of a structure of a DNS query packet according to this application.

In an implementation of this application, as shown in FIG. 6, the DNS query packet may include a packet header, a query question, an answer, an authorization, and additional information. The packet header is used to describe a quantity of resource records of the answer, a quantity of resource records of the authorization, a quantity of resource records of the additional information, and the like.

Figure 7:
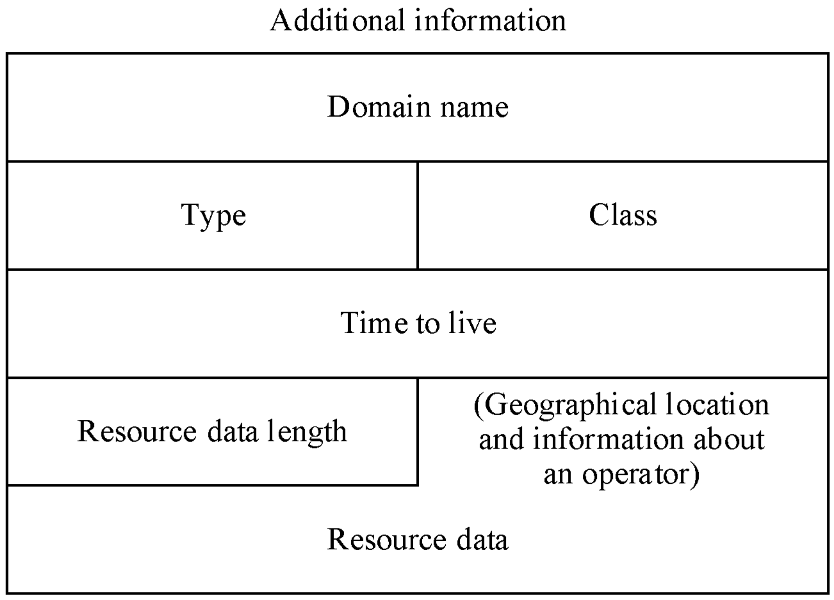
FIG. 7 is a schematic diagram of a structure of additional information of the DNS query packet shown in FIG. 6.

In an implementation of this application, as shown in FIG. 7, the additional information may include a variable-length or 2-byte domain name, a 2-byte type, a 2-byte class, 4-byte time to live, a 2-byte resource length, and variable-length resource data. The domain name is used to carry the to-be-accessed domain name, and the query type is querying an IP address by using the to-be-accessed domain name, or querying the to-be-accessed domain name by using an IP address. The query class being 1 usually refers to Internet data. The time to live is an IP address obtained through query, or valid time of the to-be-accessed domain name obtained through query. The resource length is a length of a related resource record. The resource data is data of a related resource record returned based on a query requirement.

Figure 8:
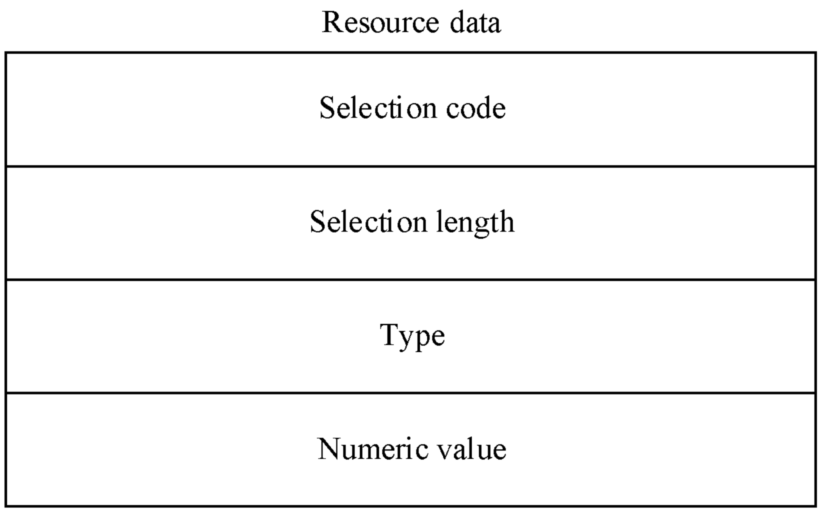
FIG. 8 is a schematic diagram of a structure of resource data in the DNS additional information shown in FIG. 7.

In an implementation of this application, as shown in FIG. 8, the resource data may include a 2-byte selection code, a 2-byte selection length, a 2-byte scheduling type, and a variable-length numeric field. The selection code is used to identify a meaning of content stored in the resource data, the selection length is used to identify a length of a numeric field, and the scheduling type is used to describe a type of the scheduling information. For example, the scheduling type being 1 is a geographical location, the scheduling type being 2 is an operator, and the scheduling type being 3 is longitude and latitude. The numeric field is used to store detailed scheduling information.

In an implementation of this application, the HTTPDNS server 341 locally queries whether the mapping relationship between the canonical name record and the network address corresponding to the canonical name record is cached. If the mapping relationship between the canonical name record and the network address corresponding to the canonical name record is not cached, the HTTPDNS server 341 constructs the DNS query packet based on the HTTP request packet.

In an implementation of this application, the to-be-accessed domain name may be carried in a resource data field of the DNS query packet, and the scheduling information of the terminal device may be carried in the resource data field of the DNS query packet.

S103: The HTTPDNS server sends the DNS query packet to an authoritative domain name server. Correspondingly, the authoritative domain name server receives the DNS query packet sent by the HTTPDNS server.

In an implementation of this application, the HTTPDNS server 341 sends the DNS query packet to the root name server 342. The root name server 342 determines a network address of a corresponding top-level domain name server 343 based on a top-level domain name in the canonical name record in the DNS query packet, and sends the network address of the top-level domain name server 343 to the HTTPDNS server 341. The HTTPDNS server 341 sends the DNS query packet to the top-level domain name server 343 based on the network address of the top-level domain name server 343. If the top-level domain name server 343 finds that the DNS query packet cannot be processed, the top-level domain name server 343 sends a network address of the authoritative domain name server 344 subordinate to the top-level domain name server 343 to the HTTPDNS server 341. The HTTPDNS server 341 sends the DNS query packet to the authoritative domain name server 344 based on the network address of the authoritative domain name server 344.

S104: The authoritative domain name server selects an optimal edge cache node from a plurality of edge cache nodes of the to-be-accessed domain name as a to-be-accessed site based on the scheduling information.

In an implementation of this application, the authoritative domain name server 344 locally queries whether a mapping relationship between the canonical name record and network addresses of the plurality of edge cache nodes corresponding to the canonical name record is stored; and if the mapping relationship between the canonical name record and the network addresses of the plurality of edge cache nodes corresponding to the canonical name record is stored, selects the optimal edge cache node from the network addresses of the plurality of edge cache nodes as the to-be-accessed site based on scheduling information of the terminal device 330 carried in the DNS query packet. In an embodiment, the authoritative domain name server 344 selects, from the network addresses of the plurality of edge cache nodes, an edge cache node nearest to a geographical location of the terminal device 330 as the to-be-accessed site based on the geographical location of the terminal device 330 carried in the DNS query packet. In another embodiment, the authoritative domain name server 344 selects, as the to-be-accessed site from the plurality of edge cache nodes of the to-be-accessed domain name based on the geographic location of the terminal device 330 and the information of the operator that are carried in the DNS query packet, an edge cache node nearest to the geographical location among edge cache nodes provided by the operator.

S105: The authoritative domain name server constructs a DNS reply packet based on an IP address of the to-be-accessed site.

S106: The authoritative domain name server sends the DNS reply packet to the HTTPDNS server. Correspondingly, the HTTPDNS server receives the DNS reply packet sent by the authoritative domain name server.

S107: The HTTPDNS server constructs an HTTP response packet based on the DNS reply packet.

S108: The HTTPDNS server sends the HTTP response packet to the terminal device. Correspondingly, the terminal device receives the HTTP response packet sent by the HTTPDNS server.

S109: The terminal device establishes a connection to the to-be-accessed site.

In an implementation of this application, the terminal device 330 establishes a connection between the terminal device 330 and the to-be-accessed site based on the network address, returned by the HTTPDNS response packet and corresponding to the canonical name record, of the to-be-accessed site, so that the to-be-accessed site can provide content data to the terminal device 330 instead of the origin-server node 310.

Figure 9:
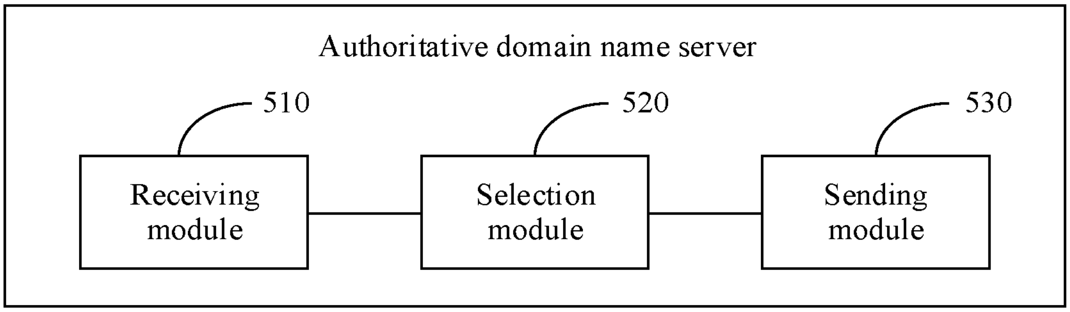
FIG. 9 is a schematic diagram of a structure of an HTTPDNS server according to this application.

FIG. 9 is a schematic diagram of a structure of an HTTPDNS server according to this application. The HTTPDNS server in this embodiment includes a receiving module 410, a constructing module 420, and a sending module 430.

The receiving module 410 is configured to receive an HTTP request packet sent by a terminal device, and the HTTP request packet carries a to-be-accessed domain name and a geographical location of the terminal device.

The constructing module 420 is configured to construct a DNS query packet based on the HTTP request packet.

The sending module 430 is configured to send the DNS query packet to an authoritative domain name server, and the DNS query packet carries the to-be-accessed domain name and the scheduling information.

The receiving module 410 is configured to receive a DNS reply packet sent by the authoritative domain name server. The DNS reply packet carries an IP address of a to-be-accessed site, and the to-be-accessed site is an edge cache node that is selected by the authoritative domain name server from a plurality of edge cache nodes of the to-be-accessed domain name and that corresponds to the scheduling information.

The constructing module 420 is configured to construct an HTTP reply packet based on the DNS reply packet.

The sending module 430 is configured to send the HTTP reply packet to the terminal device, and the HTTP reply packet carries the IP address of the to-be-accessed site.

The HTTPDNS server shown in FIG. 9 can perform steps performed by the HTTPDNS server in the foregoing domain name query method. For details, refer to FIG. 4 and related descriptions. Details are not described herein again.

Figure 10:
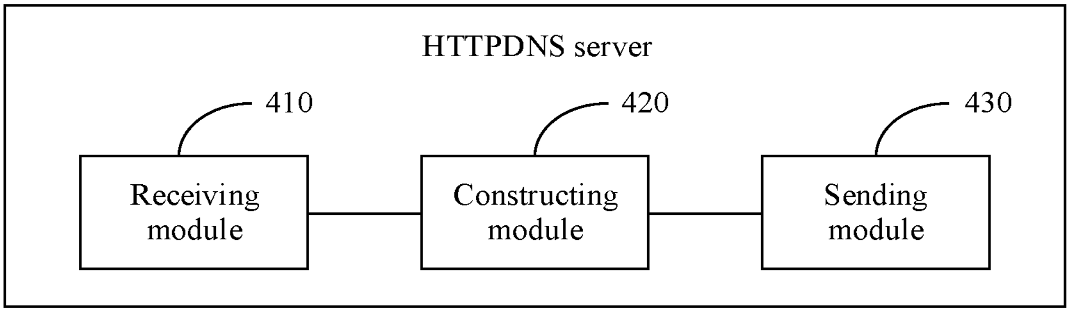
FIG. 10 is a schematic diagram of a structure of an authoritative domain name server according to this application.

FIG. 10 is a schematic diagram of a structure of an authoritative domain name server according to this application. The authoritative domain name server includes a receiving module 510, a selection module 520, and a sending module 530.

The receiving module 510 is configured to receive a DNS query packet sent by an HTTPDNS server, and the DNS query packet carries a to-be-accessed domain name and scheduling information.

The selection module 520 is configured to select, based on the scheduling information, an edge cache node corresponding to the scheduling information from a plurality of edge cache nodes of the to-be-accessed domain name as a to-be-accessed site.

The sending module 530 is configured to send a DNS reply packet to the HTTPDNS server, and the DNS reply packet carries an IP address of the to-be-accessed site.

The authoritative domain name server shown in FIG. 10 can perform steps performed by the authoritative domain name server in the foregoing domain name query method. For details, refer to FIG. 4 and related descriptions. Details are not described herein again.

This application further provides a domain name query system, including an origin-server node, a CDN, a terminal device, an HTTPDNS server, and an authoritative server. The origin-server site is connected to the CDN, the CDN is connected to the terminal device, and the terminal device is connected to a DNS. The DNS includes an HTTPDNS server, a root name server, a top-level domain name server, and an authoritative domain name server.

Figure 11:
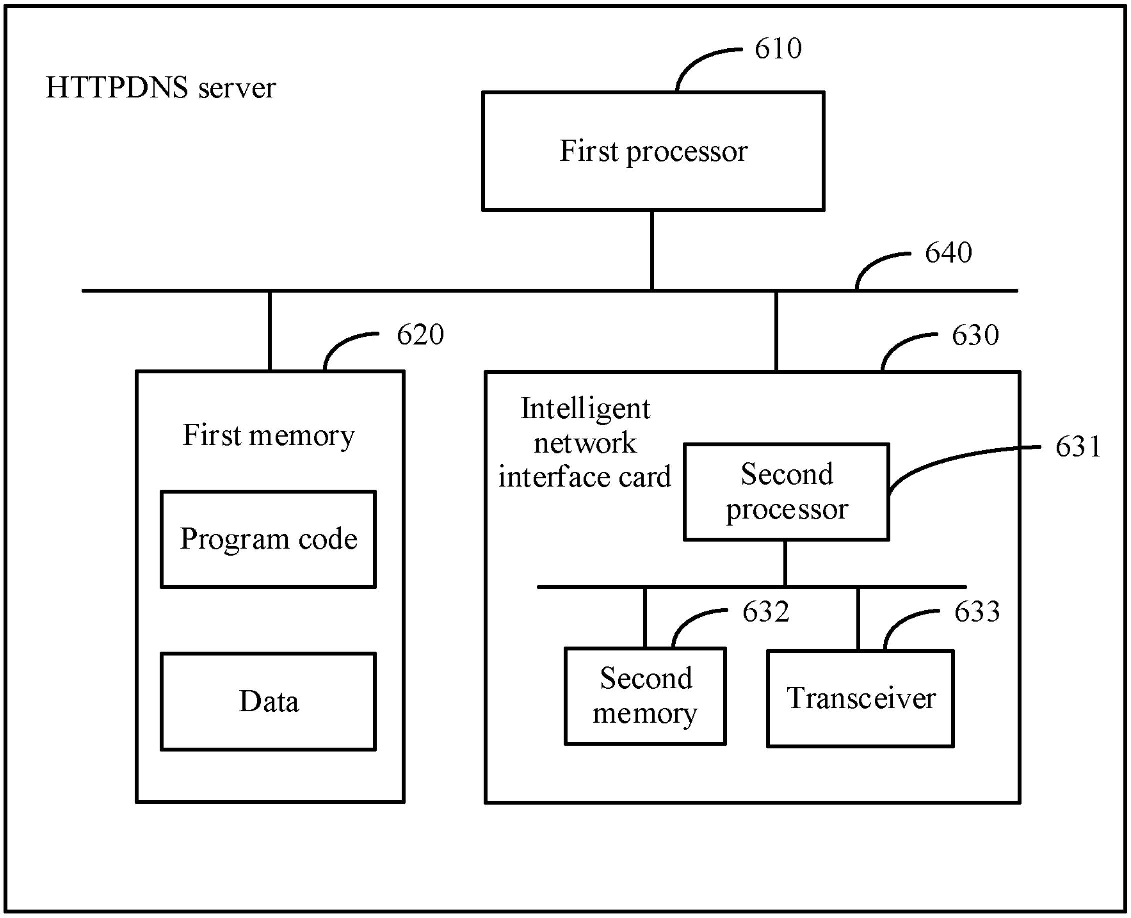
FIG. 11 is a schematic diagram of a structure of another HTTPDNS server according to this application.

Refer to FIG. 11. The HTTPDNS server may usually include a first processor 610, a first memory 620, an intelligent network interface card 630, and a bus 640.

The first processor 610 may be one or more general-purpose processors. The general-purpose processor may be any type of device capable of processing an electronic instruction, including a central processing unit (CPU), a microprocessor, a microcontroller, a main processor, a controller, an application-specific integrated circuit (ASIC), or the like. The first processor 610 executes various types of digital storage instructions, for example, software or firmware programs stored in the first memory 620. In an embodiment, the first processor 610 may be an x86 processor or the like. The first processor 610 sends a command to the first memory 620 through a physical interface, to complete a storage-related task. For example, commands that may be provided by the first processor 610 include a read command, a write command, a copy command, an erase command, and the like. The command may specify an operation related to a specific page and block of the first memory 620.

The first memory 620 may be a random-access memory (RAM), a flash memory, or the like, or may be a RAM, a read-only memory (ROM), a hard disk drive (HDD), or a solid-state drive (SSD).

The intelligent network interface card 630 is also referred to as a network interface controller, a network interface card, or a local area network (LAN) adapter. Each intelligent network interface card 630 has a unique MAC address, which is burned into a read-only memory chip by a manufacturer of the intelligent network interface card 630 during production. The intelligent network interface card 630 includes a second processor 631, a second memory 632, and a transceiver 633. The second processor 631 is similar to the first processor 610, but a performance requirement of the second processor 631 may be lower than a performance requirement of the first processor 620. In an embodiment, the second processor 631 may be an ARM processor or the like. The second memory 632 may also be a flash memory, an HDD, or an SDD, and a storage capacity of the second memory 632 may be less than a storage capacity of the first memory 620. The transceiver 633 may be configured to: receive and send packets, and upload the received packet to the second processor 631 for processing. The intelligent network interface card 630 may further include a plurality of ports, and the port may be any one or more of three types of interfaces: a thick-cable interface, a thin-cable interface, and a twisted pair interface.

The first processor 610 runs program code in the first memory 620, to perform the following steps.

The intelligent network interface card 630 is configured to receive an HTTP request packet sent by a terminal device. The HTTP request packet carries a to-be-accessed domain name and scheduling information of the terminal device.

The first processor 610 is configured to construct a DNS query packet based on the HTTP request packet, and sends the DNS query packet to an authoritative domain name server. The DNS query packet carries the to-be-accessed domain name and the scheduling information.

The intelligent network interface card 630 is configured to receive a DNS reply packet sent by the authoritative domain name server. The DNS reply packet carries an IP address of a to-be-accessed site, and the to-be-accessed site is an edge cache node that is selected by the authoritative domain name server from a plurality of sites of the to-be-accessed domain name and that corresponds to the scheduling information.

The first processor 610 is configured to construct an HTTP reply packet based on the DNS reply packet, and sends the HTTP reply packet to the terminal device. The HTTP reply packet carries the IP address of the to-be-accessed site.

The HTTPDNS server shown in FIG. 11 can perform steps performed by the HTTPDNS server in the foregoing domain name query method. For details, refer to FIG. 4 and related descriptions. Details are not described herein again.

Figure 12:
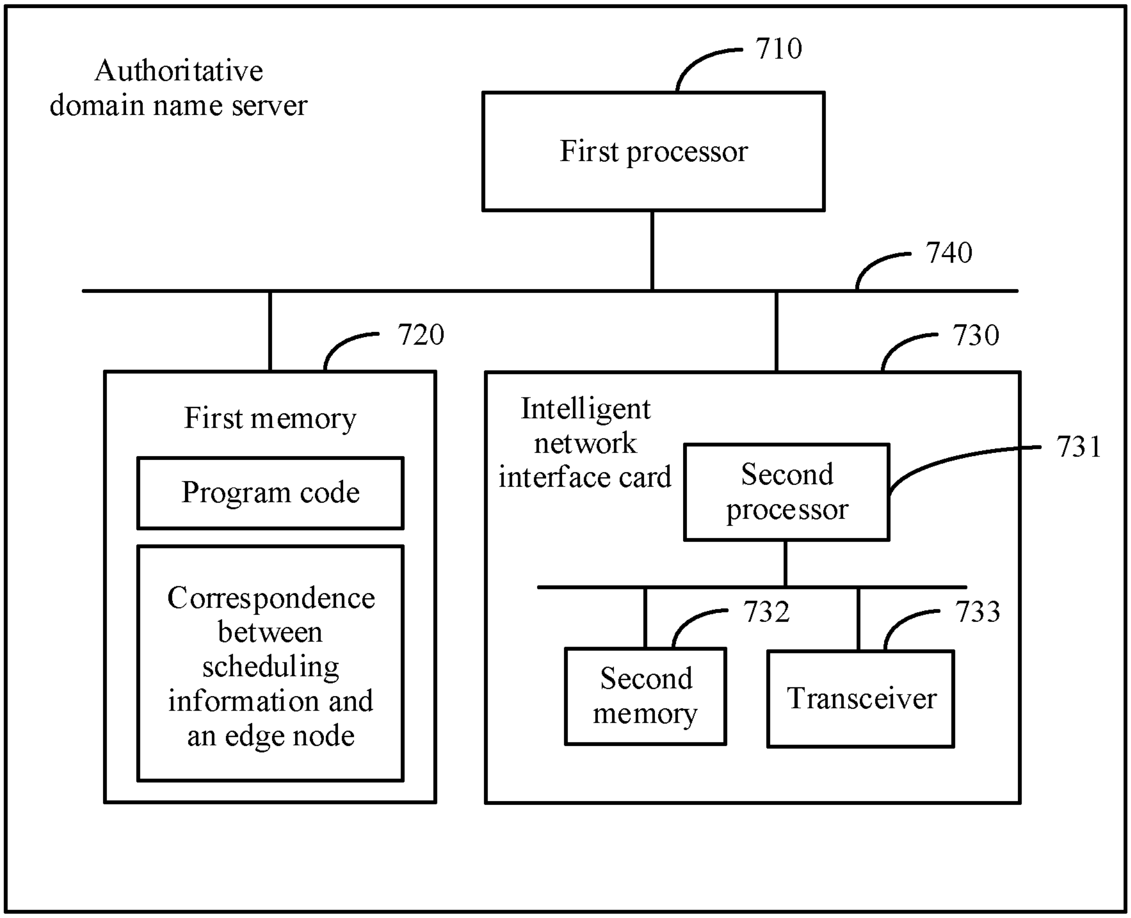
FIG. 12 is a schematic diagram of a structure of another authoritative domain name server according to this application.

Refer to FIG. 12. The authoritative domain name server may usually include a first processor 710, a first memory 720, an intelligent network interface card 730, and a bus 740.

The first processor 710 may be one or more general-purpose processors. The general-purpose processor may be any type of device capable of processing an electronic instruction, including a CPU, a microprocessor, a microcontroller, a main processor, a controller, an ASIC, or the like. The first processor 710 executes various types of digital storage instructions, for example, software or firmware programs stored in the first memory 720. In an embodiment, the first processor 710 may be an x86 processor or the like. The first processor 710 sends a command to the first memory 720 through a physical interface, to complete a storage-related task. For example, commands that may be provided by the first processor 710 include a read command, a write command, a copy command, an erase command, and the like. The command may specify an operation related to a page and block of the first memory 720. In an example, a command may request to write data to a physical page, or another command may request to erase a physical block. A plurality of virtual machines may be virtualized in the first processor 710, and a corresponding operating system may be installed on each virtual machine.

The first memory 720 may be a RAM, a flash memory, or the like, or may be a RAM, a ROM, an HDD, or an SSD.

The intelligent network interface card 730 is also referred to as a network interface controller, a network interface card, or a LAN adapter. Each intelligent network interface card 730 has a unique MAC address, which is burned into a read-only memory chip by a manufacturer of the intelligent network interface card 730 during production. The intelligent network interface card 730 includes a second processor 731, a second memory 732, and a transceiver 733. The second processor 731 is similar to the first processor 710, but a performance requirement of the second processor 731 may be lower than a performance requirement of the first processor 720. In an embodiment, the second processor 731 may be an ARM processor or the like. The second memory 732 may also be a flash memory, an HDD, or an SDD, and a storage capacity of the second memory 732 may be less than a storage capacity of the first memory 720. The transceiver 733 may be configured to: receive and send packets, and upload the received packet to the second processor 731 for processing. The intelligent network interface card 730 may further include a plurality of ports, and the port may be any one or more of three types of interfaces: a thick-cable interface, a thin-cable interface, and a twisted pair interface.

The first processor 710 runs program code in the first memory, to perform the following steps.

The intelligent network interface card 730 is configured to receive a DNS query packet sent by an HTTPDNS server, where the DNS query packet carries a to-be-accessed domain name and scheduling information.

The first processor 710 is configured to select, based on the scheduling information, an edge cache node corresponding to the scheduling information from a plurality of edge cache nodes of the to-be-accessed domain name as a to-be-accessed site.

The intelligent network interface card 730 is configured to send a DNS reply packet to the HTTPDNS server, where the DNS reply packet carries an IP address of the to-be-accessed site.

The authoritative domain name server shown in FIG. 12 can perform steps performed by the authoritative domain name server in the foregoing domain name query method. For details, refer to FIG. 4 and related descriptions. Details are not described herein again.

In the foregoing solution, the terminal device adds the geographical location to the HTTP request packet, and sends the HTTP request packet to the HTTPDNS server. Then, the HTTPDNS server adds the geographical location to the DNS query packet, and sends the DNS query packet to the authoritative domain name server. The authoritative domain name server selects the edge cache node nearest to the geographical location from the plurality of edge cache nodes of the to-be-accessed domain name as the to-be-accessed site based on the geographical location, and enables the terminal device to access the to-be-accessed site. The geographical location is a real geographical location of the terminal device. Therefore, when the authoritative domain name server performs scheduling based on the geographical location, no scheduling deviation occurs, and the terminal device can be scheduled to the truly optimal edge cache node.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the processes or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a storage disk, or a magnetic tape), an optical medium (for example, a digital versatile disc (DVD), or a semiconductor medium.

What is claimed is:

1. A method comprising:

receiving, from a Hypertext Transfer Protocol Domain Name System (HTTPDNS) server, a Domain Name System (DNS) query packet that carries a to-be-accessed domain name, a selection code, a selection length, a scheduling type code, and scheduling information, wherein the selection code identifies an intent of the DNS query packet, wherein the scheduling information comprises a geographical location of a terminal device added to an HTTP request packet and the DNS query packet, wherein the scheduling type code indicates a scheduling information type of the scheduling information, wherein the geographical location is at least one of: a longitude and a latitude, an administrative area, or a street, and wherein the to-be-accessed domain name is mapped to a canonical name record comprising a second domain name;

querying whether a mapping relationship between the canonical name record and network addresses of a plurality of edge cache nodes corresponding to the second domain name is locally stored;

confirming that the mapping relationship is locally stored;

selecting, after confirming that the mapping relationship is locally stored, an edge cache node nearest to the geographical location from the network addresses of the plurality of edge cache nodes as a to-be-accessed site based on the geographical location; and sending, to the HTTPDNS server, a DNS reply packet that carries an Internet Protocol (IP) address of the to-be-accessed site.

2. The method of claim 1, wherein the scheduling information is in a resource data field of the DNS query packet.

3. The method of claim 1, wherein the scheduling information further comprises information about an operator to which the terminal device belongs, and wherein selecting the edge cache node comprises selecting the edge cache node from edge cache nodes of the operator.

4. The method of claim 1, wherein the edge cache node is a single hop away from the terminal device.

5. The method of claim 1, wherein the geographical location is the administrative area of the terminal device.

6. The method of claim 1, wherein the geographical location is the street of the terminal device.

7. A server, comprising:

one or more processors; and a memory configured to store instructions that, when executed by the one or more processors, cause the server to:

receive, from a Hypertext Transfer Protocol Domain Name System (HTTPDNS) server, a Domain Name System (DNS) query packet that carries a to-be-accessed domain name, a selection code, a selection length, a scheduling type code, and scheduling information, wherein the selection code identifies an intent of the DNS query packet, wherein the scheduling information comprises a geographical location of a terminal device added to an HTTP request packet and the DNS query packet, wherein the scheduling type code indicates a scheduling information type of the scheduling information, wherein the geographical location is at least one of: a longitude and a latitude, an administrative area, or a street, and wherein the to-be-accessed domain name is mapped to a canonical name record comprising a second domain name;

query whether a mapping relationship between the canonical name record and network addresses of a plurality of edge cache nodes corresponding to the second domain name is locally stored;

confirm that the mapping relationship is locally stored;

select, after confirming that the mapping relationship is locally stored, an optimal edge cache node nearest to the geographical location from the network addresses of the plurality of edge cache nodes as a to-be-accessed site based on the geographical location; and send, to the HTTPDNS server, a DNS reply packet that carries an Internet Protocol (IP) address of the to-be-accessed site.

8. The server of claim 7, wherein the scheduling information is in a resource data field of the DNS query packet.

9. The server of claim 7, wherein the scheduling information further comprises information about an operator to which the terminal device belongs, and wherein when executed by the one or more processors, the instructions are further configured to cause the server to select the edge cache node from edge cache nodes of the operator.

10. The server of claim 7, wherein the edge cache node is a single hop away from the terminal device.

11. The server of claim 7, wherein the geographical location is the administrative area of the terminal device.

12. The server of claim 7, wherein the geographical location is the street of the terminal device.

13. A computer program product comprising instructions that are stored on a non-transitory computer-readable medium and that, when executed by a processor, cause a server to:

receive, from a Hypertext Transfer Protocol Domain Name System (HTTPDNS) server, a Domain Name System (DNS) query packet that carries a to-be-accessed domain name, a selection code, a selection length, a scheduling type code, and scheduling information, wherein the selection code identifies an intent of the DNS query packet, wherein the scheduling information comprises a geographical location of a terminal device added to an HTTP request packet and the DNS query packet, wherein the scheduling type code indicates a scheduling information type of the scheduling information, wherein the geographical location is at least one of: a longitude and a latitude, an administrative area, or a street, and wherein the to-be-accessed domain name is mapped to a canonical name record comprising a second domain name;

query whether a mapping relationship between the canonical name record and network addresses of a plurality of edge cache nodes corresponding to the second domain name is locally stored;

confirm that the mapping relationship is locally stored;

select, after confirming that the mapping relationship is locally stored, an optimal edge cache node nearest to the geographical location from the network addresses of the plurality of edge cache nodes as a to-be-accessed site based on the geographical location; and send, to the HTTPDNS server, a DNS reply packet that carries an Internet Protocol (IP) address of the to-be-accessed site.

14. The computer program product of claim 13, wherein the scheduling information is in a resource data field of the DNS query packet.

15. The computer program product of claim 13, wherein the scheduling information further comprises information about an operator to which the terminal device belongs, and wherein when executed by the one or more processors, the instructions are further configured to cause the server to select the edge cache node from edge cache nodes of the operator.

16. The computer program product of claim 13, wherein the edge cache node is a single hop away from the terminal device.

17. The computer program product of claim 13, wherein the geographical location is the administrative area of the terminal device.

18. The computer program product of claim 13, wherein the geographical location is the street of the terminal device.

* * * * *